June 13, 1967 E. P. EVERETT 3,324,778
MEANS FOR ADVANCING FILM
Filed July 20, 1961 3 Sheets-Sheet 1

INVENTOR:
Ernest P. Everett

INVENTOR:
Ernst P. Everett

United States Patent Office 3,324,778
Patented June 13, 1967

3,324,778
MEANS FOR ADVANCING FILM
Ernest P. Everett 706½ Grove St. N.,
St. Petersburg, Fla. 12345
Filed July 20, 1961, Ser. No. 125,522
6 Claims. (Cl. 95—31)

This invention relates to a method and means for taking pictures with a Polaroid type camera. As this type of camera does not have any exterior mechanism for advancing the film through the lens section of the camera, I therefore have invented a means whereby a standard color or black and white type film can be used in the camera and deposited in a specially designed cassette and then be removed from the camera for processing.

This is accomplished as the film is advanced through the camera from the film roll to the receiving cassette in a novel manner which I will explain as you proceed with the specifications and drawings.

Another feature of my invention is that the spiral cassette in its assembled form, while containing the exposed film, may be used for processing the exposed film.

The processing may be accomplished by providing the cassette with suitable processing materials. This method is possible on account of the spacing of the film, by being held in the spiral track which allows the processing materials to come in contact with both surfaces of the film.

It is preferable to remove the cassette containing the exposed element from the camera and introducing the processing materials into the cassette. This may be done with a syringe or any suitable means. After a suitable time, the end caps of the cassette are removed and the developed negative of each exposure are produced.

As the temperature control of the developer is an important factor the cassette containing the exposed film may be encased in a rubber container such as a rubber finger and emersed in a water bath of the desired temperature thereby controlling the temperature of the developer in the cassette. After a suitable time the end caps of the cassette are removed and the film is further processed as normally practiced.

Another feature of my invention is to have a plain cassette without the spiral ends and without any spindle and whereby the film is advanced in the manner hereto described, removed from the camera and sent to be processed. I do not wish to limit myself to the types of cassettes herein described as certain types of film may require variation of the construction of the type of cassette to be used or do I limit myself to the use of the spiral cassette for home development as it also may be sent to be processed in the usual commercial manner.

Due to the simplicity of the plain cassette I have not shown a drawing of same or do I show a feature of the backing element which is explained in the specifications.

I will explain the above in detail as you proceed with the specifications and drawings.

Figure 5:
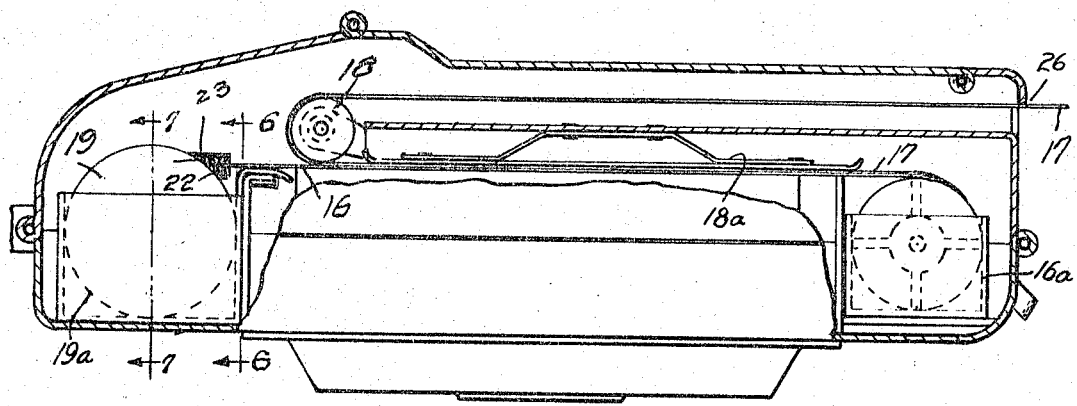
FIG. 5 is a side elevation of the closed camera with parts of the casing broken away and in cross section.
Figure 6:
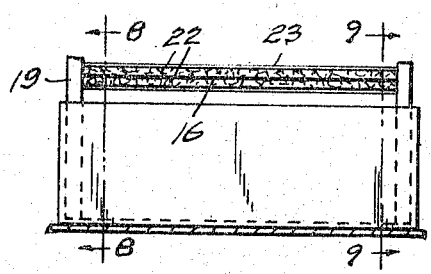
FIG. 6 is a sectional view taken on lines 6—6 of FIG. 5, looking in the direction of the arrows.
Figure 7:
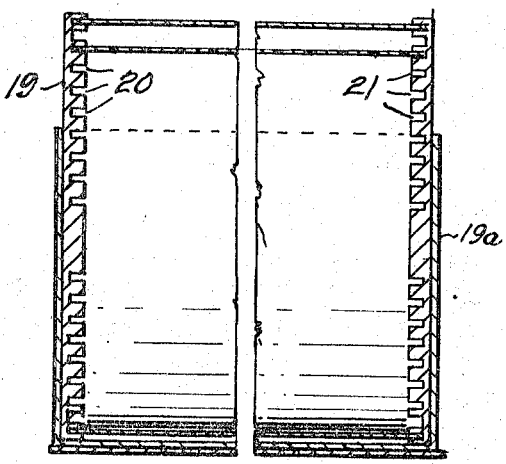
FIG. 7 is an enlarged sectional view taken on lines 7—7 of FIG. 5, looking in the direction of the arrows.

A roll of film 16, is deposited in a first well 16a defined at one end of the camera as shown in FIG. 5. The roll of film 16, containing a backing element 17, is advanced in sequence to a roller, 18, FIG. 5, and at this point the backing element, 17, separates from the exposed portion of the film, 16.

The backing element turns over the roller, 18, and travels in an opposite direction, as the film advances and enters the receiving cassette, 19. The cassette 19 is disposed in a second well 19a defined adjacent the roller 18 as shown in FIG. 5. The first and second wells are at opposite ends of the lens section or exposure area of the camera as defined by guide means including the roller 18 and a spring biased guide plate 18a.

Figure 2:
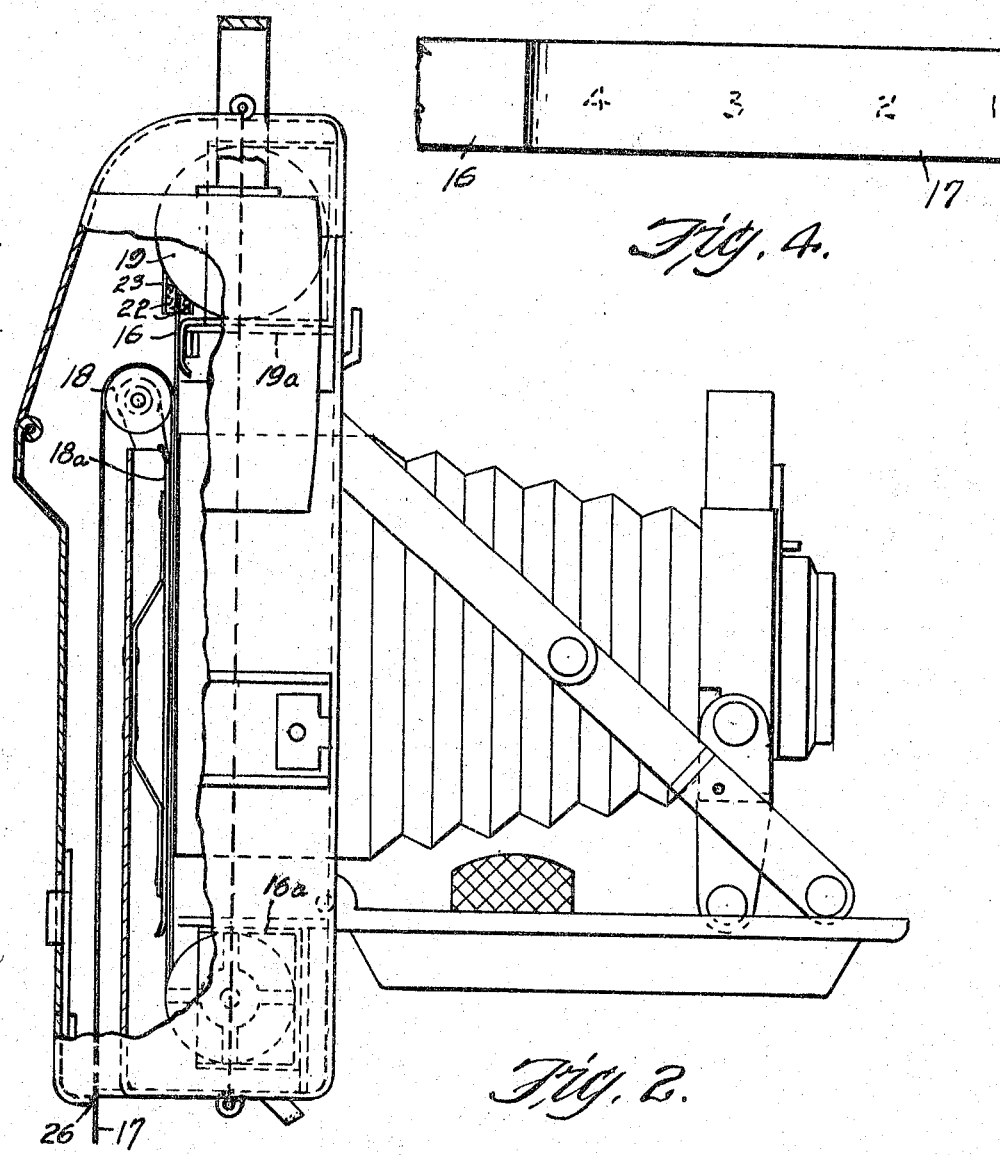
FIG. 2 is a side view of the camera, with a part of the camera case broken away and showing parts in cross section.

As each exposure is made, the backing element, 17, in its travel in opposite direction to the film, 16, is pulled out of the camera at 26, FIG. 2 and 5. From the position indicated by roller, 18, the film separates from the backing element, 17, and is automatically advanced by the backing element into the cassette. As the exposed film enters the cassette, 19, it is guided by the two spiral tracks, 20, FIG. 8 and 21, FIG. 9, and the reason for the spiral tracks is mainly to keep the convolutely wound film from binding against the inner wall of the cassette, 19, as the film is deposited in the cassette.

Figure 8:
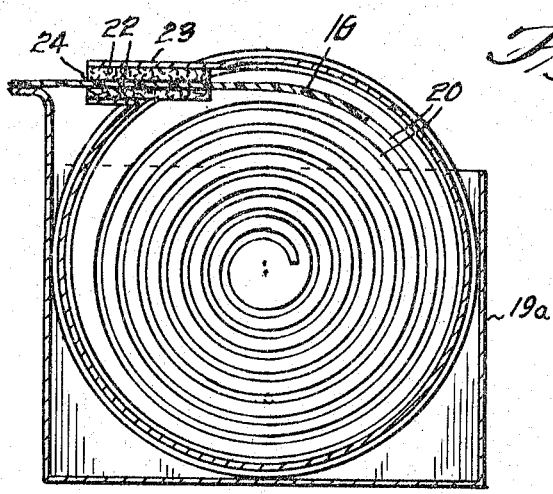
FIG. 8 is an enlarged left-hand sectional view of one of the end caps of the cassette showing the spiral track for receiving the exposed film.
Figure 9:
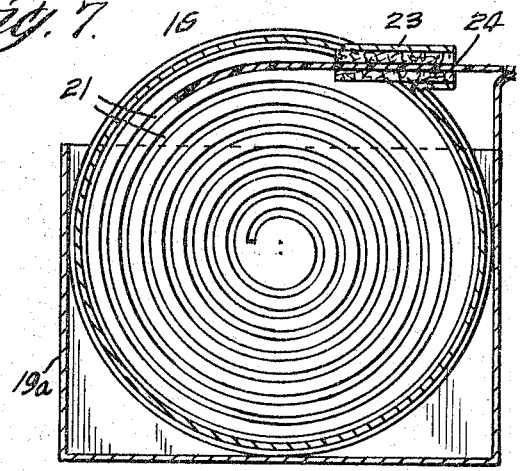
FIG. 9 is an enlarged, right-hand sectional view of the other end cap of the cassette showing the spiral track for receiving the exposed film.

The cassette does not have any moving parts and it is held stationary and firmly against the side parts of the camera (press fit). The cassette, FIGS. 8-9, is provided with an inner element, 22, and an exterior element, 23, and also with an apron, 24. The inner element is to keep the film from backing outwardly, and has a braking action, and in combination with the outer element, acts as a closure to prevent light from damaging the exposed film as the cassette is removed from the camera.

The apron, 24, is positioned as shown to prevent the film from damage by coming in contact with sharp metal parts of the camera as shown at 24, FIGS. 8 and 9.

Figure 1:
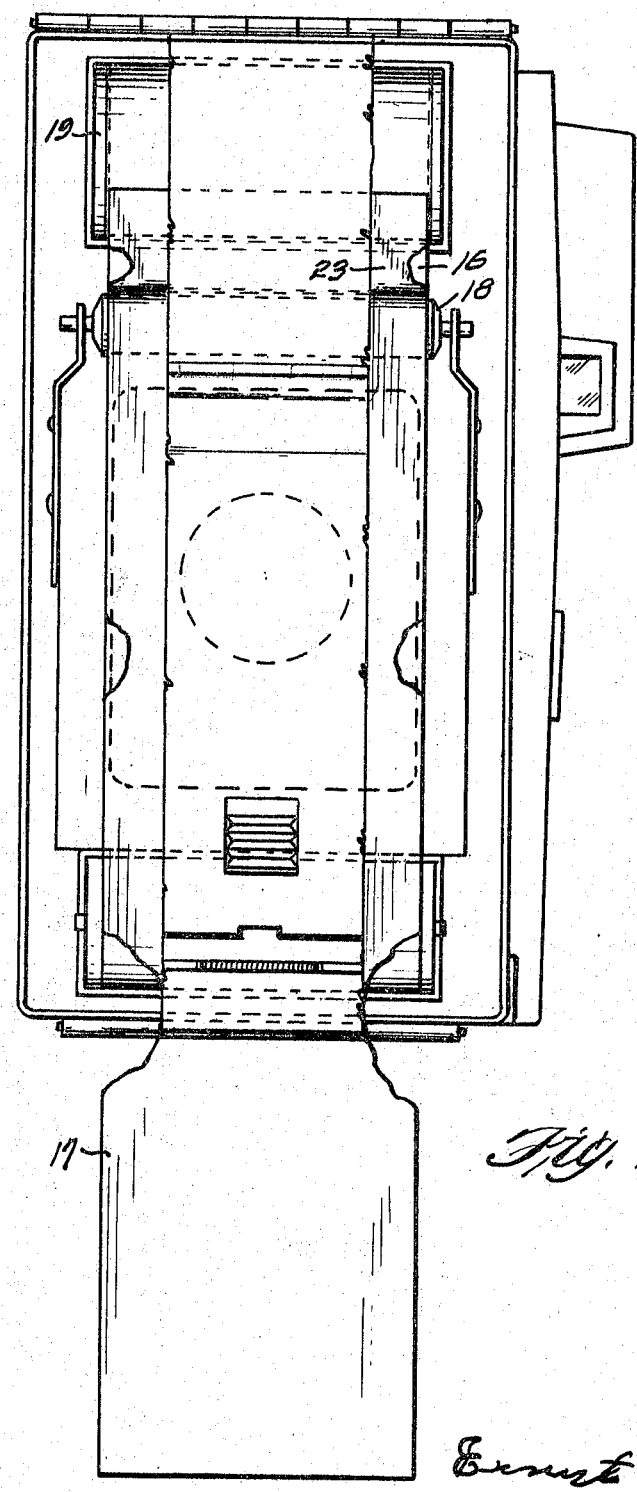
FIG. 1 is a rear elevation of a Polaroid type camera with portions thereof broken away, clearly showing the film and its backing element.
Figure 4:
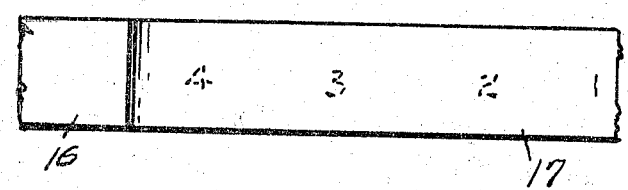
FIG. 4 is a plan view of a film and its backing element, the backing element having printing numerals thereon.
Figure 3:
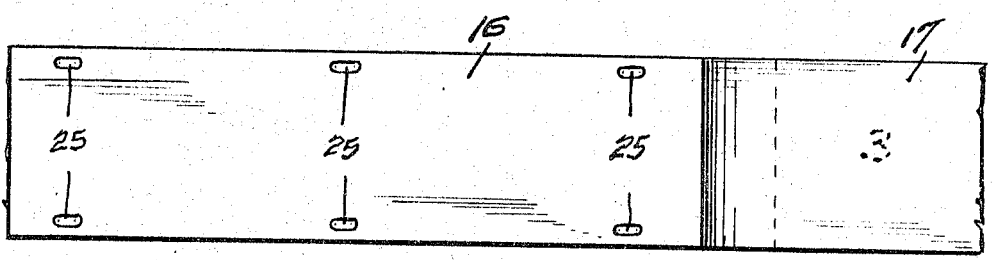
FIG. 3 is a plan view of part of a film and its backing element, the film having openings therein.

The backing element may be used for gauging the distance for advancing the film after each exposure, and this is accomplished by having space markers on one face of the backing element FIGS. 3 and 4.

The face of the backing element which contacts the back of the film may have an abrasive surface to prevent slippage between these two elements.

Another method which may be used to gauge the distance of advancing the film after each exposure is to have holes, 25, FIG. 3 on each side of the film so that when the film is advanced, two of these holes engage two stops, not shown, and after each exposure, the film may be advanced by realeasing the film from the two stops by operating a bar, not shown, and after each exposure, the film may be advanced by releasing the film from the two stops by operating a bar, not shown, located at the end of the camera.

From the foregoing, it is evident that I have provided a novel means of taking pictures with color film in a camera of this type, and also provided a method of depositing the exposed film in a container whereby it may be removed from the camera in the light, to be processed. My invention will enable those who use this type of camera to purchase a standard color film and a cassette of the type herein described, and take color pictures with this type of camera, an accomplishment which heretofore has not been possible.

From the foregoing it is evident that I have provided a means of using this type of camera for exposing color film and without jeopardizing its use for black and white photography.

Therefore I have enhanced the value of this type of camera.

I do not claim as my invention, any parts of the camera, or the camera itself, but I do claim:

1. For use in a camera of the type having first and second wells disposed at opposite ends of an exposure area lying in a plane defined by guide means, the combination of:
   (a) a film supply roll including an opaque backing strip superimposed on a photosensitive film strip,
   (b) said backing strip comprising an abrasive surface frictionally engaging said film strip but being separable therefrom.

2. For use in a camera of the type having first and second wells disposed at opposite ends of an exposure area lying in a plane defined by guide means, the combination of:
   (a) a film supply roll including an opaque backing strip superimposed on a photosensitive film strip,
   (b) said backing strip comprising an abrasive surface frictionally engaging said film strip but being separable therefrom,
   (c) a cassette having an opening for reeciving one end of said film strip,
   (d) said supply roll and said cassette being adapted to be disposed in said first and second wells respectively, with said film and backing strip extending therebetween through said exposure area and with said backing strip being pressed into engagement with said film strip by said guide means,
   (e) whereby pulling on said backing strip to move it from said supply roll past said guide means will advance said film strip from said supply roll into said cassette.

3. For use in a camera of the type having first and second wells disposed at opposite ends of an exposure area lying in a plane defined by guide means, the combination of:
   (a) a film supply roll including an opaque backing strip superimposed on a photosensitive film strip,
   (b) said backing strip comprising an abrasive surface frictionally engaging said film strip but being separable therefrom,
   (c) a cassette having an opening for receiving one end of said film strip, said cassette comprising an apron defining said opening, and including light sealing and film braking means in said opening,
   (d) said supply roll and said cassette being adapted to be disposed in said first and second wells respectively, with said film and backing strip extending therebetween through said exposure area and with said backing strip being pressed into engagement with said film strip by said guide means,
   (e) whereby pulling on said backing strip to move it from said supply roll past said guide means will advance said film strip from said supply roll into said cassette.

4. For use in a camera of the type having first and second wells disposed at opposite ends of an exposure area lying in a plane defined by guide means, the combination of:
   (a) a film supply roll including an opaque backing strip superimposed on a photosensitive film strip,
   (b) said backing strip comprising an abrasive surface frictionally engaging said film strip but being separable therefrom,
   (c) a cassette comprising a light tight housing having end walls and having an opening between said end walls for receiving one end of said film strip, said cassette comprising spaced spiral tracks formed on the inner surfaces of said end walls,
   (d) said supply roll and said cassette being adapted to be disposed in said first and second wells respectively, with said film and backing strip extending therebetween through said exposure area and with said backing strip being pressed into engagement with said film strip by said guide means.

5. For use in a camera of the type having first and second wells disposed at opposite ends of an exposure area lying in a plane defined by guide means, the combination of:
   (a) a film supply roll including an opaque backing strip superimposed on a photosensitive film strip,
   (b) said backing strip comprising an abrasive surface frictionally engaging said film strip but being separable therefrom,
   (c) a cassette comprising a light tight housing having end walls and having an opening between said walls for receiving one end of said film strip said cassette including an apron defining said opening in part, and including light sealing and film braking means in said opening,
   (d) said supply roll and said cassette being adapted to be disposed in said first and second wells respectively, with said film and backing strip extending therebetween through said exposure area and with said backing strip being pressed into engagement with said film strip by said guide means,
   (e) whereby pulling on said backing strip to move it from said supply roll past said guide means will advance said film strip from said supply roll into said cassette.

6. The combination of a photographic film and a backing element one surface of which has a rough surface said rough surface pressing against the back surface of the film and the other surface of the backing element provided with signals and numerals indicative of the position of the film as exposure is made.

References Cited
UNITED STATES PATENTS

| | | | |
|---|---|---|---|
| 607,428 | 7/1898 | Esmond | 95—34 |
| 1,454,045 | 5/1923 | Dodge | 95—31 |
| 2,214,581 | 9/1940 | Freeman | 95—90.5 |
| 2,223,208 | 11/1940 | Fullerton | 95—90.5 |
| 2,367,424 | 1/1945 | Nichols | 95—90.5 |
| 2,555,202 | 5/1951 | Ormond | 95—90.5 |
| 2,751,309 | 6/1956 | Baxter | 96—78 X |

JOHN M. HORAN, *Primary Examiner.*

D. B. LOWE, NORTON ANSHER, F. B. LEONARD,
*Assistant Examiners.*